May 10, 1966  A. J. HIPP  3,250,646
FUEL CELL ELECTRODE
Filed Aug. 16, 1960

Inventor
Allen J. Hipp
By Richard R. Mybeck
Attorney

United States Patent Office 3,250,646
Patented May 10, 1966

3,250,646
FUEL CELL ELECTRODE
Allen J. Hipp, Wauwatosa, Wis., assignor to Allis-Chalmers Manufacturing Company, Milwaukee, Wis.
Filed Aug. 16, 1960, Ser. No. 49,957
4 Claims. (Cl. 136—120)

This invention relates generally to the manufacture of fuel cells and more particularly to the manufacture of improved components for use in fuel cells to be operated at atmospheric pressure and ambient temperature.

"Fuel cells," as that term is herein used, defines those devices in which chemical energy of fuels is converted directly into electrical energy by electrochemical reaction.

As is known, such devices are designed to exploit a chemical reaction such, for example as:

$$H_2 + \tfrac{1}{2}O_2 = H_2O + \text{Energy}$$

in which the reactants ($H_2$, $O_2$) separately possess more energy than the product they form ($H_2O$). When this condition exists, it is said that the reactants "prefer" to exist in combination. In going into combination, the surplus of energy formed (it is known that the energy components in any reaction equation must balance), is removed from the system as electrical energy.

Thus, an even more specific definition of a fuel cell is that it is a device which essentially comprises (1) means for containing a preselected chemical reaction of the type which provides a surplus of energy and (2) means for capturing the "surplus" energy formed by the reaction as electrical energy.

As generally constructed, a fuel cell comprises a container into which two porous electrically conductive electrodes are mounted to have an electrolyte therebetween. For exemplary purposes only, the fuel cell shall be herein described as a hydrogen-oxygen type cell, although any suitable combination of fuel and oxidant may be employed within the scope of this disclosure. In the case of the hydrogen-oxygen fuel cells, a most satisfactory electrolyte is found among the hydroxides of the alkali metals such, for example, as sodium hydroxide, potassium hydroxide and the like.

At one side of the cell, when it is conditioned for operation, the fuel gas is fed into the space (called a "gas space") between one of the electrodes and the housing. The gas diffuses from the space through the electrode (herein called the "negative" electrode) and is adsorbed on the surface of the electrode where it reacts with the electrolyte to free an electron.

An external path is provided by a suitable conductor to connect the negative electrode with the second electrode (herein called the "positive" electrode) at the other side of the cell. The electrons, deposited upon the negative electrode in the manner indicated, thus flow through the external path to the positive electrode to provide an electric current which can be put to work.

Further, the flow of the electrons through the external path provided between the electrodes in addition to constituting the electric output of the cell, also provides support to the oxygen half of the reaction, as will now be explained.

On the positive side of the cell, an oxidant is fed into the space between the electrode and the housing. The oxidant diffuses through the electrode and is adsorbed on the electrode surface.

Then, by a somewhat circuitous reaction, the adsorbed oxidant the incoming electrons ($e^-$) and the water in the electrolyte react to form hydroxyl ions. The hydroxyl ions then complete the cycle by migrating through the electrolyte to the negative electrode.

While efficiency of energy transformation is of extreme importance to the advent of a practical fuel cell, there are other factors which must also be considered before a fuel cell is to enter a competitive market.

One extremely important factor is the length of time a cell can operate with good current densities and constant voltage before its performance falls off due to, inter alia, the deterioration of the electrode or the electrolyte.

It is toward this later consideration, viz., the enhancement of the current characteristics at constant voltage and prolongation of the operative life of the fuel cells, that the present invention is generally directed.

Of course, this goal has been sought by others, one of the more successful being Francis Bacon of the University of Cambridge who developed a high-temperature, high-pressure fuel cell. (See Bacon, Great Britain 667,298, February 27, 1952.)

The work of Bacon with the high-temperature, high-pressure fuel cells, while greatly increasing the power output of fuel cells over what was previously obtained, still did not provide a cell of universal applicability.

As a practical matter, there are several pressing applications in which the high temperatures and/or high pressures required of the Bacon cell are either unobtainable or undesirable for a variety of reasons, not the least of which are these operational requirements themselves.

Others such as Mond et al., U.S. 409,366, and Gunn et al., U.S. 2,384,463, have attempted to construct cells which eliminate the operational requirements of Bacon, that is, which operate at low temperatures and under atmospheric pressure conditions because of special catalyst materials. Generally, these cells have failed to obtain commercially practicable power outputs.

A major problem in the low temperature catalyst-activated fuel cell is obtaining an electrode-catalyst arrangement which enables a maximum amount of current per unit of electrode area to be obtained at a constant voltage. Hence, we face a specific problem which the present invention solves.

The present invention is predicated upon our discovery that the strategic deposition of special applications of catalytic compositions upon a plaque formed of porous nickel and the like, provides, for use in fuel cells and like apparatus, an electrode which is mechanically stable, chemically resistant to attack by fuel cell electrolyte, provides a maximum surface for deposition of catalyst, maximum accessibility to the catalytic surface for both the electrolyte and the reactant gases, which can be utilized either as an anode, a cathode or both and which, in action, delivers a high current density per unit of surface area at a constant voltage for a remarkably unexpected length of time.

To a great extent, this problem is the same as that solved by my copending application, Fuel Cell Electrode and Method of Making Same, Serial No. 39,345, now U.S. Patent 3,110,622, filed June 28, 1960.

A further problem which is encountered in the application of catalyst upon electrode plaques also needs solution. It evolves from the fact that the most effective catalyst presently known for low-temperature, low-pressure fuel cells is platinum, an extremely costly reagent as explained in my aforementioned copending application, other catalysts in the platinum family, to wit: palladium, ruthenium, osmium, iridium and rhodium, do give vastly improved results when handled in the manner therein described but the electrodes carrying a platinum catalyst were still the best.

The problem then is to find a way to obtain an electrode for use in the fuel cell which provides the electrical characteristics of an electrode carrying platinum catalyst while substantially eliminating a major portion of, and thereby the cost of the platinum and/or platinum compounds heretofore required.

The present disclosure presents a relatively simple but remarkably unexpected solution to that problem based upon my discovery that the replacement of as much as 90% of platinum from the catalytic concentration disposed upon the electrode plaque with another catalyst such as palladium, does not, as would be expected, reduce the electrical properties of the cell to a value somewhere between that obtainable when the concentrations are respectively completely of platinum and palladium, but rather, when performed in the manner and within the limits hereinafter defined, provides results at least equal to that obtainable when the catalytic concentration is entirely formed of platinum.

Accordingly, one of the prime objects of the present invention is to provide an improved electrode for use in a fuel cell which operates at atmospheric pressure and ambient temperature to obtain a high efficiency and high power output at a significantly lower cost than theretofore believed obtainable.

It is another object of the present invention to provide a method of manufacturing improved electrodes for low-temperature, low-pressure fuel cells in which the strategic application from special catalytic formulations, in and on an electrode plaque, obtain an unexpectedly remarkable catalytic action in the operation of a fuel cell.

An even further object of the present invention is to provide an improved method of forming an electrode for low pressure ambient temperature fuel cells in which catalyst is strategically disposed upon an electrode plaque and obtains therewith a bond of remarkable tenacity.

A still further object of the present invention is to provide an improved method of forming an electrode for fuel cells whereby an enhanced effective catalytic surface area is realized having its maximum catalyst concentration at the situs of maximum utility.

Still another object of the present invention is to provide an improved electrode for use in fuel cells and like apparatus and a method of producing same in which a porous plaque is treated with sequential applications of catalytic compositions to provide an intermittently, essentially monomolecular, catalytic concentration at the situs of maximum utility whereby the gas adsorptive characteristic of the electrode is substantially equal to electrodes bearing an equal amount of platinum deposited thereupon by the best method nown and is greatly enhanced over the characteristic of electrodes bearing an equal amount of platinum deposed by the single application technique common to the art prior to the advance described in my aforementioned copending application.

It is still another object of the present invention to provide an electrode for a low temperature catalyst activated fuel cell which develops remarkably enhanced current densities per unit area of surface while maintaining a constant voltage.

It is still another object of the present invention to provide an improved fuel cell electrode which is mechanically stable, nonbrittle, resistant to shock, chemically resistant to attack by fuel cell electrolyte and possesses a relatively large catalytic surface which is readily accessible to both electrolyte and reactant gases.

Another object of the present invention is to provide a new method of applying catalyst to porous nickel plaques in which the plaque is successively immersed into a plurality of specially formulated beaths having the synergist propensity of applying catalyst to random portions of the plaque surface and thereafter etching other portions thereof to produce new active centers for the acceptance of additional catalyst from subsequent baths.

These and still further objects, as shall hereinafter appear, are readily fulfilled by the present invention in a remarkably unexpected fashion as shall be discerned from the following detailed description of methods and electrodes exemplifying the present invention. Further, the complete significance and scope of the advance of the present disclosure will be further enhanced when the foregoing is considered in conjunction with the accompanying drawing in which.

Figure 1:
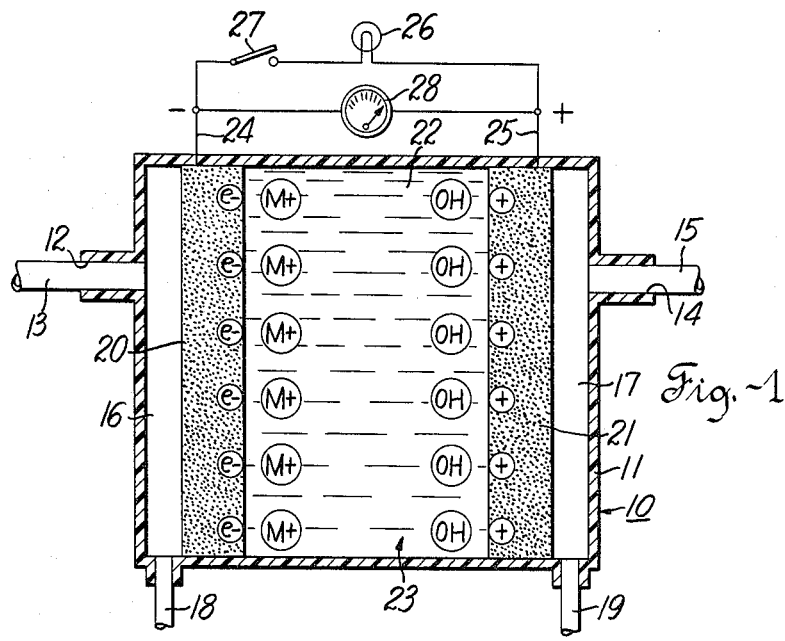
FIG. 1 is a schematic showing of a fuel cell under "no load" conditions.

Referring now to FIG. 1, a fuel cell of the type which may employ the present invention is indicated by the general reference number 10.

Fuel cell 10 comprises a housing 11 having a gas inlet means 12 defined in the left (relative to the drawing) side wall thereof connecting the fuel cell, by means of a suitable connecting tube 13, with a source (not shown) of a suitable gaseous fuel such, for example, as hydrogen or the electrochemically reactive hydrogen compounds such as the aliphatic hydrocarbons, methane, ethane, propane and the like.

Second gas inlet means 14 is similarly defined in the opposed or right (relative to the drawing) side wall thereof for connecting the fuel cell, by means of a suitable connecting tube 15, with a source (not shown) of a suitable oxidant for which oxygen, the most common, will be considered illustrative.

Gas inlet means 12 and 14, respectively, feed gas spaces 16 and 17 defined within the housing in a manner to be hereinafter more fully described. Each gas space, 16 and 17, is respectively provided with outlet means 18, 19 at at bottom thereof for trapping and discharging condensate therefrom.

Disposed within housing 11 and in spaced relationship to each other are first and second electrode members 20, 21 which coact with each other and housing 11 to define therebetween a chamber 22 which, when the cell is prepared for operation, is filled with the suitable electrolyte 23. Electrodes 20, 21 further provide the inner wall for gas spaces 16, 17, respectively.

Extending out from housing 11 are a pair of electrical leads 24, 25. Lead 24 is connected to electrode 20, while lead 25 is connected to electrode 21. To form a complete circuit, lead 25 extends to and is connected through a suitable load, exemplified by lamp 26, to one terminal of a conventional "off-on" switch 27 while lead 24 is connected to another terminal of switch 27.

In order to determine the electrical characteristics of the circuit thus established, a suitable electrical meter, such as voltmeter 28, may be connected in parallel across the circuit.

In FIG. 1, which represents a "on load" condition in asmuch as switch 27 is open and the circuit through the load is broken, the ionic action within the cell is represented as near dormant.

Figure 2:
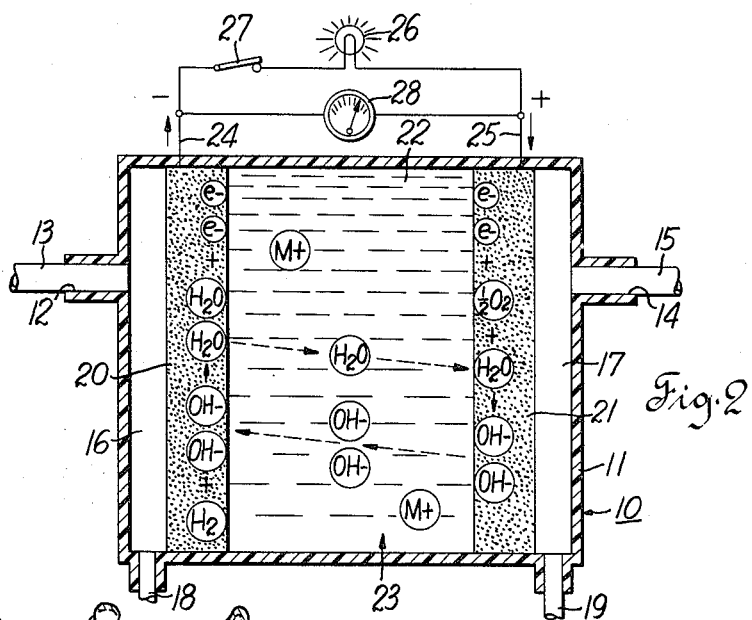
FIG. 2 is a schematic showing of the fuel cell of FIG. 1 under "full load" conditions.

In FIG. 2, the cell of FIG. 1 is shown with switch 27 closed thereby completing the circuit and establishing an external flow of electrons between electrode 20 (hereinafter referred to as "negative electrode") and electrode 21 (hereinafter referred to as the "positive electrode") through load 26.

FIG. 2 also shows schematically the relative action of the various ions and molecules during the operation of the cell. It is, of course, understood that for purposes of this description, the illustrations of the cells and the ions, electrons, etc., depicted therewith, are predominantly schematic and are shown merely to exemplify the mechanics of the cell rather than to accurately reproduce either the quantities or the actual positions of the elements at any given instant.

It is, of course, further understood that the above description merely exemplifies one type of fuel cell in which the electrode might be employed and is definitey not intended as a limitation upon its use.

Figure 3:
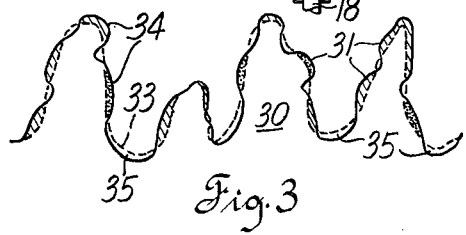
FIG. 3 is a schematic showing of a face of an electrode plaque prepared in accordance with this invention illustrating the manner in which it is believed to function.

Referring to FIG. 3, the thesis of the present invention is schematically illustrated and shows fragmentarily, a mechanically strong porous plaque 30 (preferably formed of sintered nickel) and catalyst concentration between immersions so that discrimination between the catalyst bearing surfaces and the noncatalyst-bearing surfaces may be obtained.

It will be noted that the original surface contour 33 (shown in phantom) of the plaque 30 undergoes a change as the catalyst concentration 31 develops and the etching action (hereinafter more fully explained) creates new active centers 35.

The superficial surface of plaque 30, after the immersion, is shown in the bold line identified as 34. The platinum in the catalyst concentration 31 is shown by the dots while the palladium therein is shown with cross hatching, it being considered that two immersions have occurred, with a palladium bath and one with a platinum bath.

The subsequent immersion into a second palladium containing bath will further develop the essentially monomolecular catalytic concentration especially in the active centers 35 to complete the plaque for use.

The method by which the active catalytic concentration 31 is formed upon plaque 30 provides an important aspect of this invention, and shall now be described.

First an electrode plaque formed, in this instance, of sintered nickel, is selected. The plaque will normally have a thickness of approximately 1/32 to about 3/8 inch although electrodes of 0.005 inch work satisfactorily. Little electrical difference is found to exist between a 1/32 inch thick and a 1/4 inch thick plaque. Other factors such as cost, weight and overall size of the ultimate unit favor a thinner plaque. The faces of the plaque will generally be rectangular and have any desired dimensions. Other surface shapes can also be employed as desired.

As a matter of good practice, it is generally desirable to make sure the plaque is clean before processing it further. One suitable technique for cleaning a contaminated plaque comprises dipping the plaque into a bath containing a suitable solvent such, for example, as trichloroethylene, boiling the bath while the plaque remains therein, and thereafter rinsing each plaque to remove any residual matter therefrom. A hot water rinse is satisfactory provided the water does not introduce new contaminants onto the surface of the plaque.

After the plaque has been determined to be clean, either initially or after further cleaning, it is then treated strategically with the unique sequence of catalyst containing formulations of the present invention, one embodiment of which shall now be described.

The clean plaque is first immersed into a bath, at ambient temperature, i.e., about 20° C., and containing about one to about three percent of palladium black, as a chloride salt, in a suitable acid such, for example, as hydrochloric acid. The bath preferably is highly acidic, that is, it has a pH value of about 1.0 or less.

The plaque is maintained in the bath while the temperature of the bath is gradually increased to about 50° C., i.e., from about 40° C. to about 70° C.

The palladium from the bath forms on the plaque, adhering initially to the more pronounced protrusions hereinafter referred to as primary active centers, to define a randomly intermediate, essentially monomolecular layer upon said primary active centers of the plaque. While this action transpires the bath, which was originally a brownish color, changes color to a very light yellow-green. The color change results from the displacement of palladium and the formation of nickel chloride, which is characterized by a light yellowish-green color, in the bath. This color change provides a very easy and accurate signal for the completion of the displacement reaction.

When the color of the bath changes from brown to yellow-green to indicate that essentially all of the palladium is gone from the bath, the bath is then heated to a temperature of about 50° C. to 80° C. to accelerate the attack of the acid of the path upon the exposed, i.e., noncatalyzed portions of the plaque. The action of the acid upon these exposed nickel portions is an etching action which creates secondary active centers on the plaque surface.

The term "active centers," as used herein, referes to those protrustions from the norm of the superficial surface of the crystals making up the electrode plaque upon which catalyst may be deployed, generally in a point having two or more sides, to provide a greater catalytic surface for exposure ot the reactive gases and thereby enhance the activity of the gases as they come into contact therewith.

Those active centers which are present on the plaque prior to any deposition of catalyst are termed primary active centers. Those active centers which are created by the acid etching action after the primary deposition of catalyst are termed secondary active centers. Those active centers which are created by the acid etching action after the secondary application of catalyst are termed tertiary active centers. Catalyst applied to the tertiary active centers is termed the tertiary application of catalyst. After the tertiary application of catalyst little further improvement can be obtained through the etching of quaternary active centers and deposition of catalyst thereon.

When the color of the bath becomes a darker green than the yellow-green originally detected, this is a signal to indicate that the desired action of the acid has occurred and that the plaque may now be withdrawn from the bath.

Next the plaque, now having one application of palladium applied thereto and being etched in the manner described, is immersed into a second bath which, at ambient temperatures, also contains about one to three percent palladium black, as a chloride salt, in a suitable acid such, for example, as hydrochloric acid. The bath is also preferably highly acidic, that is, it has a pH value of 1.0 or less.

The plaque is maintained in this bath while the temperature of the bath is gradually increased to 30° C.–50° C. It is not necessary to heat the subsequent baths as high as the initial since, for reasons not fully understood, the subsequent application of catalyst to the plaque once it has catalyst applied and is etched in the manner described, occurs more readily and at lower temperatures than does the application of catalyst to the fresh plaque in the first bath. The palladium from the bath begins to form on the plaque, being drawn by the secondary origin active centers thereon previously provided by the preceding etch. In the meantime, the bath, which originally possessed a brownish color, changes to a light yellowish-green color. The color change again signals the change of the bath solution to one containing nickel chloride which, as is known, is characterized by a light yellowish-green color.

When the color change of the bath occurs, i.e., from brown to yellow-green, substantially all of the palladium chloride is gone from the bath and the bath is then heated to a temperature of 50° C.–80° C. to accelerate the etching effect of the acid of the bath upon the remaining exposed portions of the nickel plaque. The action of the acid upon the uncatalyzed or exposed nickel creates tertiary active centers.

When the bath acquires a darker green color than the yellow-green detected at the beginning of the etching period, the plaque can be withdrawn from the bath and rinsed as before.

The plaque, now carrying primary and secondary origins of catalyst and freshly etched tertiary active centers created in the manner described, should be carrying at least approximately 10–14 milligrams of palladium per each square inch of superficial plaque area. If the plaque is carrying less than this amount, as can readily be calculated using well known stoichiometric calculations, a third bath may be employed in the same manner as the second bath, just described, to achieve this mean concentration.

After the mean concentration of palladium has been deposited upon the electrode plaque in the randomly intermittent essentially monomolecular fashion described, the plaque is now in condition for its final processing as shall now be described.

The palladium-bearing plaque is next immersed into another bath, likewise at ambient temperatures. This bath, however, contains about one to three percent platinum black, as a salt such, for example, as platinic chloride in a suitable acid such, for example, as hydrochloric acid. The bath is preferably highly acidic, that is, it has a pH of 1.0 or less.

The plaque is maintained in this bath while the temperature of the bath is gradually increased to about 30° to about 50° C. to enhance the rate of chemical deposition of platinum onto portions of the plaque intermediate the portions of palladium already there. The platinum forms on the plaque at the tertiary active centers provided thereupon by the preceding etch. As the platinum deposits upon the plaque, the bath again changes color from the characteristic golden color of platinic chloride to a yellow-green which indicates clearly and accurately that a nickel chloride salt is formed in the bath.

Upon noting this color change, the plaque may be removed from the bath, suitably rinsed, as with distilled water, dried and is ready to use.

For most electrodes employed in fuel cells today, two palladium applications from baths each containing from about five to about ten milligrams of palladium for each square inch of electrode surface area and one platinum application from a bath containing from about 1 to about 3 milligrams of platinum for each square inch of electrode surface area will produce quite satisfactory results. It is, of course, understood that the exact formulation of the several baths will vary for electrode plaques having different surface areas, the exact amount of catalyst in solution being determinable by well known stoichiometric calculations which require no elaboration here.

If it is desired to use other of the platinum family metals for the palladium in the foregoing process, although palladium is preferred, equally accurate color changes also occur. Thus, when original baths containing iridium chloride (brownish-black), osmium chloride (dark brown), rhodium chloride (reddish-brown) and ruthenium chloride (colorless) are used the above indicated characterizing colors will change to the predominant yellowish-green of nickel chloride as the application nears completion.

The foregoing process thus illustrates, among other things, two contributions to the art of especial importance, namely: (1) decided and unexpected properties are provided in the operation of fuel cells and like electrical apparatus when the electrodes are manufactured by treating the electrode with primary, secondary and tertiary origin applications of catalyst thereto from a bath which synergistically coacts with the plaque to further etch uncatalyzed portions of the plaque, without disturbing the catalyzed portions thereof, to create new active centers for the subsequent application of catalyst; and (2) decided and unexpected properties are provided in the operation of fuel cells and like electrical apparatus when the electrodes are manufactured by treating the electrode with a plurality of catalytic applications of varied catalysts of which only about 10–20% need be platinum.

While the foregoing describes an embodiment of the present invention in which the application of platinum occurs last, equally fine results are obtained when platinum is applied first and when platinum is applied intermediate of the application of other catalytic materials as shown in Table III, below.

It was further determined as will appear that the ultimate catalytic concentration need only contain about 10–20%, such for example as 17%, platinum in order to give excellent results.

It was still further determined, as will also appear, that only the anode requires the treatment in the amounts herein described and the cathode functions quite well with a significantly reduced catalytic concentration, that is, of about 5 milligrams/inch$^2$ mean concentration, which contains no platinum at all.

Data rigorously supporting the foregoing has been accumulated and is set forth in subsequent tables.

Thus, Table I presents the results of operating a fuel cell of the type shown in the drawing with a porous nickel plaque carrying sequential applications of platinum deposited in accordance with the teaching of my aforementioned copending application. All of the electrodes were provided with catalytic concentrations on both faces, each measuring one inch square in area.

*Table I*

| Wt. of Catalyst Applied (gms.) | No. of Appl. | Current Density (Amps/ft.$^2$) | Voltage (Volts) |
|---|---|---|---|
| 0.038 | 2 | 14.0 | 0.7 |
| 0.057 | 3 | 18.0 | 0.7 |
| 0.076 | 4 | 29.0 | 0.7 |

Table II sets forth the results of operating a fuel cell with porous nickel plaques carrying palladium which has been sequentially applied in accordance with the teaching or my aforementioned application.

*Table II*

| Wt. of Catalyst Applied (gms.) | No. of Appl. | Current Density (Amps/ft.$^2$) | Voltage (Volts) |
|---|---|---|---|
| 0.044 | 2 | 15.0 | 0.7 |
| 0.066 | 3 | 22.0 | 0.7 |

It will be noted that while electrodes prepared by sequential palladium catalyzation provides remarkably improved electrical properties in comparison to those of the prior art which were catalyzed by a single application of palladium, they still do not attain the efficiencies (amps/gms. of applied catalyst) achieved by the electrodes which are catalyzed with platinum.

The goal of the present invention, as previously stated, thus becomes even more apparent. A technique of catalyzation was needed which would provide electrodes having the efficiencies of an electrode catalyzed with platinum but which could significantly reduce, if not completely eliminate, the need to use platinum which presently costs about $81.00–$85.00 per troy ounce.

The fact that the partial replacement of palladium for platinum in the sequential catalyzation of fuel cell electrodes permits the realization of electrical properties commensurate with complete catalyzation with platinum is even more surprising when one considers the normal performance of these materials as set forth in Tables I and II above. Thus the results of the present invention are completely contrary to the normal expectation to be deduced from the previously determined characteristics of these elements (one would expect that the replacement of one or more catalytic applications of platinum by palladium would tend to provide an electrode having an efficiency somewhere between the limits of each of the materials when they are used exclusively).

As indicated by the following examples, the contrary is true. The sequence of this invention produces electrodes whose efficiency is commensurate with, and in some instances superior to, the electrode carrying only platinum catalyst.

The following examples are presented, of course, merely to facilitate a more complete understanding of the present invention and not as limitations upon its scope.

The plaques used in these several examples are composed of fine powdered nickel which is pressed over a nickel screen and sintered in a furnace at approximately 1200 C. The plaque is approximately 80 percent porous, semiflexible, and the nickel crystals are dendritic in shape with triangular faces.

EXAMPLE 1

Square porous nickel electrodes were prepared according to this invention and incorporated into a fuel cell of the type described above. The fuel electrode received two applications of palladium to provide a randomly intermittent essentially monomolecular catalytic concentration having a mean density (in terms of the superficial area of the electrode plaque) of 0.013 gram/inch$^2$. The final catalytic application of platinum was provided by a bath formulated to provide a mean density of 0.0025 gram of platinum per square inch of superficial plaque area. An identical electrode was prepared for the oxygen side of the cell. Each electrode measured 0.060 inch in thickness.

The cell when operated on these electrodes provides a current density of 28.6 amps per square foot of superficial electrode area at a constant voltage of 0.74 volt.

EXAMPLE 2

A fuel electrode (anode) was prepared in the same manner as in Example 1. The oxygen electrode (cathode) was prepared with two applications of palladium to provide a randomly intermittent essentially monomolecular catalytic concentration having a mean density of 0.004 gram/inch$^2$. Each electrode measured 0.028 inch in thickness.

The cell when operated with these electrodes provided a current density of 29 amps per square foot of superficial electrode area at a constant voltage of 0.69 volt.

EXAMPLE 3

The anode was prepared by the sequential application of 0.0035 gram per square inch palladium and 0.0015 gram per square inch platinum. The palladium was applied from two baths and the platinum from one.

The cathode was prepared by the sequential application from two baths of 0.0025 gram per square inch of palladium.

Each electrode measured 0.028 inch in thickness.

The cell operated with these electrodes developed a current density of 28.6 amps per square foot at a constant voltage of 0.70 volt.

EXAMPLE 4

An anode was prepared, using appropriate baths and the manner described, having a first application of 0.0025 gram per square inch of platinum, and a second and third application, each being approximately 0.0065 gram per square inch of palladium.

A cathode was prepared using the same method having two applications, each being approximately 0.0025 gram per square inch of palladium.

The cell operated with these electrodes developed an open circuit voltage of 0.99 volt. The closed circuit characteristics of this cell are reported in Table III below.

EXAMPLE 5

An anode was prepared, using appropriate baths and the aforedescribed technique, having a first application of 0.0065 gram/inch$^2$ of palladium, a second application of 0.0025 gram/inch$^2$ of platinum, and a third application of 0.0065 gram/inch$^2$ of palladium.

A cathode was prepared, using the same methods, having two applications, each of approximately 0.0025 gram/inch$^2$ of palladium.

The cell operated with these electrodes developed an open circuit voltage of 0.99 volt. The closed circuit characteristics of this cell are reported in Table III below.

EXAMPLE 6

An anode was prepared, using appropriate baths and the aforedescribed methods, to have a first and second application of palladium, each of about 0.0065 gram/inch$^2$, and a third application of 0.0025 gram/inch$^2$ of platinum.

The cathode was prepared the same as in Examples 4 and 5.

The cell operated with these electrodes developed an open circuit voltage of 0.98 volt. The closed circuit characteristic of this cell are reported in Table III below.

EXAMPLE 7

This sample was prepared to provide a standard against which to measure the results obtained for the previous three samples. The technique here used was the chemical deposition technique introduced by my copending application identified above.

The anode was formed having three applications of platinum, the first two being 0.005 gram/inch$^2$ and the third being 0.0055 gram/inch$^2$ to give a total catalyst concentration of 0.0155 gram/inch$^2$ as in the previous examples.

The cathode was similarly formed with two applications of platinum, each being 0.0025 gram/inch$^2$.

The cell operated with these electrodes developed an open circuit voltage of 1.00 volt. The closed circuit characteristics of this cell are also reported in Table III below.

EXAMPLE 8

A second standard was prepared using palladium. The anode was provided with three applications of catalyst being of 0.005, 0.005 and 0.0055 gram per square inch respectively. Thus this sample also carried a catalytic concentration of 0.0155 gram per square inch as did the other samples.

The cathode carried two applications of catalyst, each being 0.0025 gram per square inch of palladium.

The cell operated with these electrodes achieved an open circuit voltage of 0.99 volt. The closed circuit characteristics of this cell are reported in Table III.

The importance of the closed circuit voltage charcteristic is known. It is this characteristic which measures the effectiveness of a given cell under actual working conditions.

Data comparing the closed circuit voltage characteristics of electrodes manufactured in accordance with the present invention (Examples 4, 5 and 6) with standard electrodes (Examples 7 and 8) are reported in Table III.

*Table III*

CLOSED CIRCUIT VOLTAGE

| Load, Amps/Ft.$^2$ | Example No. | | | | |
|---|---|---|---|---|---|
|  | 4 | 5 | 6 | 7 | 8 |
| 1.4 | 0.89 | 0.89 | 0.88 | 0.87 | 0.86 |
| 2.8 | 0.86 | 0.86 | 0.86 | 0.85 | 0.83 |
| 7.2 | 0.82 | 0.81 | 0.81 | 0.77 | 0.75 |
| 11.5 | 0.78 | 0.78 | 0.77 | 0.68 | 0.68 |
| 14.2 | 0.76 | 0.76 | 0.75 | 0.62 | 0.64 |
| 21.6 | 0.70 | 0.70 | 0.69 | 0.51 | 0.58 |
| 28.8 | 0.63 | 0.65 | 0.62 | 0.43 | 0.50 |

From Table III it becomes apparent that when the small percentage of platinum is added to palladium in a separate application, higher current densities are obtainable even over a catalytic concentration which is completely platinum (Example 7).

Thus, a new method of preparing electrodes for use in fuel cells and like apparatus has been described which fulfills the aforestated objectives in a remarkably unexpected fashion and decidedly advances the progress of science in its field.

It is, of course, understood that the several examples and embodiments herein described and illustrated are intended to exemplify the present invention rather than limit it and it is intended that such modifications, alterations and applications as shall occur to one skilled in this art when confronted by this disclosure shall be embraced within the spirit hereof, especially as that spirit is defined by the claims appended hereto.

Having now particularly described and ascertained the nature of my said invention and the manner in which it is to be performed, I declare that what I claim is:

1. An electrode for use in fuel cells and like apparatus comprising: a porous nickel plaque having spaced oppositely faced surfaces, at least one of said surfaces having a plurality of active centers of primary and secondary origin defined therein; and substantially monomolecular randomly distinct deposits of platinum and another catalyst selected from the group consisting of palladium, iridium, rhodium, osmium and ruthenium upon said surface and said primary and secondary origin active centers, said catalytic deposits being mutually exclusive and consisting of 10–20% platinum and the remainder a catalyst selected from said group.

2. An electrode according to claim 1 in which said catalyst concentration has an average density of about fifteen milligrams per square inch of the superficial surface area of said plaque.

3. An electrode according to claim 1 in which both of said surfaces have a plurality of active centers of primary and secondary origin defined therein and both of said surfaces have substantially monomolecular randomly distinct deposits of platinum and another catalyst selected from the group consisting of palladium, iridium, rhodium, osmium, and ruthenium thereupon and upon said primary and secondary origin active centers, said catalytic deposits being mutually exclusive and consisting of from about 10% to 20% (by weight) platinum and the remainder a catalyst selected from said group.

4. An electrode according to claim 1 in which said another catalyst is palladium.

References Cited by the Examiner

UNITED STATES PATENTS

| | | | |
|---|---|---|---|
| 1,243,111 | 10/1917 | Sanders | 136—120 |
| 2,384,463 | 9/1945 | Gunn | 136—120.1 |
| 2,409,295 | 10/1946 | Marvin et al. | 117—113 |
| 2,690,402 | 9/1954 | Crehan | 117—160 X |
| 2,860,175 | 11/1958 | Justi | 136—120 |
| 2,955,959 | 10/1960 | Du Rose | 117—113 |
| 3,110,622 | 11/1963 | Hipp | 136—86 X |

FOREIGN PATENTS 874,283   8/1961   Great Britain.

JOHN H. MACK, *Primary Examiner.*

JOHN R. SPECK, SAMUEL FEINBERG, *Examiners.*

S. PARKER, W. VANSISE, *Assistant Examiners.*